United States Patent [19]

Ooba

[11] Patent Number: 6,062,191
[45] Date of Patent: May 16, 2000

[54] FUEL INJECTION CONTROL SYSTEM FOR INTERNAL COMBUSTION ENGINE

[75] Inventor: Hiraku Ooba, Yokohama, Japan

[73] Assignee: Nissan Motor Co., Ltd., Yokohama, Japan

[21] Appl. No.: 09/138,013

[22] Filed: Aug. 21, 1998

[30] Foreign Application Priority Data

Aug. 21, 1997 [JP] Japan ................................. 9-225329

[51] Int. Cl.$^7$ ............................................... F02B 17/00
[52] U.S. Cl. .......................................... 123/295; 123/305
[58] Field of Search ...................................... 123/295, 305

[56] References Cited

U.S. PATENT DOCUMENTS

| | | | |
|---|---|---|---|
| 5,794,586 | 8/1998 | Oda et al. | 123/305 |
| 5,875,756 | 3/1999 | Kamura et al. | 123/295 |
| 5,878,711 | 3/1999 | Kamura et al. | 123/295 |

FOREIGN PATENT DOCUMENTS 63-138118  6/1988  Japan .

*Primary Examiner*—John Kwon
*Attorney, Agent, or Firm*—Foley & Lardner

[57] ABSTRACT

In a direct injected, spark ignition internal combustion engine of a type having a stratified charge combustion mode and a homogeneous charge combustion mode, a controller selects one of the combustion modes in accordance with a sensed engine operating condition and calculates only the fuel injection quantity of the selected mode to lessen the load of calculation. The controller calculates a stratified mode fuel injection timing on the compression stroke only during the period of the stratified mode whereas the controller calculates a homogeneous mode injection timing on the intake stroke during the periods of both the homogeneous mode and the stratified mode to achieve a quick and smooth changeover from the stratified mode to the homogeneous mode. During the period of the stratified mode, the homogeneous mode injection timing is calculated in accordance with the fuel injection quantity according to the stratified mode.

17 Claims, 10 Drawing Sheets

6,062,191

FUEL INJECTION CONTROL SYSTEM FOR INTERNAL COMBUSTION ENGINE

BACKGROUND OF THE INVENTION

The present invention relates to an internal combustion engine, and more specifically to an engine control system and process for controlling fuel injection of an engine of a type having a stratified charge combustion mode and a homogeneous charge combustion mode.

Recently, the technique of in-cylinder direct fuel injection in a spark ignition engine such as a gasoline engine is under development to improve the fuel efficiency and emission performance by using stratified charge combustion and homogeneous charge combustion.

In low and medium load regions, a control system for such a type operates an engine in a stratified combustion mode by injecting fuel directly into a combustion chamber during the compression stroke so as to produce a stratified combustible mixture only around the spark plug. The thus-achieved stratified combustion enables stable combustion with an ultra lean mixture, and hence significant improvement in the fuel efficiency and emission performance of the engine.

In a high load region over a predetermined engine load, the engine is operated in a homogeneous combustion mode to meet a demand for higher output torque. In the homogeneous combustion mode, fuel is injected during the intake stroke so as to produce a homogeneous air fuel mixture. (In some examples, a fuel injection valve for the homogeneous mode is provided separately in an intake port.)

The control system changes over the combustion mode between the homogeneous mode and the stratified mode in accordance with one or more engine operating conditions.

An engine control system as disclosed in Japanese Patent Provisional (Kokai) Publication No. 63(1988)-138118 is arranged to always calculate both the fuel injection quantity and injection timing according to the stratified combustion mode and the fuel injection quantity and injection timing according to the homogeneous combustion mode.

SUMMARY OF THE INVENTION

It is an object of the present invention to provide apparatus and process capable of changing over a combustion mode of an internal combustion engine promptly and easily.

Specifically, the apparatus and process according to the present invention can achieve a combustion changeover from the stratified mode to the homogeneous mode promptly without the need for always calculating both the stratified mode fuel injection quantity and timing and the homogeneous mode fuel injection quantity and timing.

According to the present invention, apparatus or process for changing over an combustion mode of an internal combustion engine between a first mode (such as a homogeneous charge combustion mode) and a second mode (such as a stratified charge combustion mode) by changing a fuel injection timing between a first injection timing for the first mode and a second injection timing for the second mode which is later than the first injection timing, comprises a controller or controlling step for selectively calculating either a first fuel injection quantity for the first mode or a second fuel injection quantity for the second mode, and for calculating the first injecting timing in accordance with either of the first fuel injection quantity and the second fuel injection quantity both during an operating period of the first mode and during an operating period of the second mode.

The controller or controlling step may be arranged to select, as a target combustion mode, one of the first and second modes, to calculate only the first fuel injection quantity if the first mode is selected and only the second fuel injection quantity if the second mode is selected, to calculate the first injection timing which is earlier than the second injection timing both when the first mode is selected and when the second mode is selected, and for calculating the first injection timing in accordance with the first injection quantity if the first mode is selected, and in accordance with the second injection quantity if the second mode is selected.

The apparatus may be in the form of an internal combustion engine equipped with a direct fuel injection system for injecting fuel directly into a combustion chamber of the engine.

The apparatus and process according to the present invention can reduce the load for calculation or computation, such as the load imposed on a computer system for calculating the fuel injection quantities and timings.

BRIEF DESCRIPTION OF THE DRAWINGS

FIG. 2 is a flowchart of a main routine for setting a fuel injection timing.

FIG. 3 is a flowchart of a routine to request setting of the fuel injection timings for a stratified charge combustion mode.

FIG. 4 is a flowchart of a routine to calculate a fuel injection quantity.

FIG. 5 is a flowchart of a routine for setting the fuel injection timing for a homogeneous charge combustion mode.

FIG. 6 is a flowchart of a routine for setting the fuel injection timing for the stratified charge combustion mode.

FIG. 7 is a flowchart of a routine for fuel injection timing measurement for the homogeneous and stratified combustion modes.

FIG. 8 is a flowchart of a routine for controlling the fuel injection according to the homogeneous charge combustion mode.

FIG. 9 is a flowchart of a routine for controlling the fuel injection according to the stratified charge combustion mode.

DETAILED DESCRIPTION OF THE INVENTION

Figure 1:
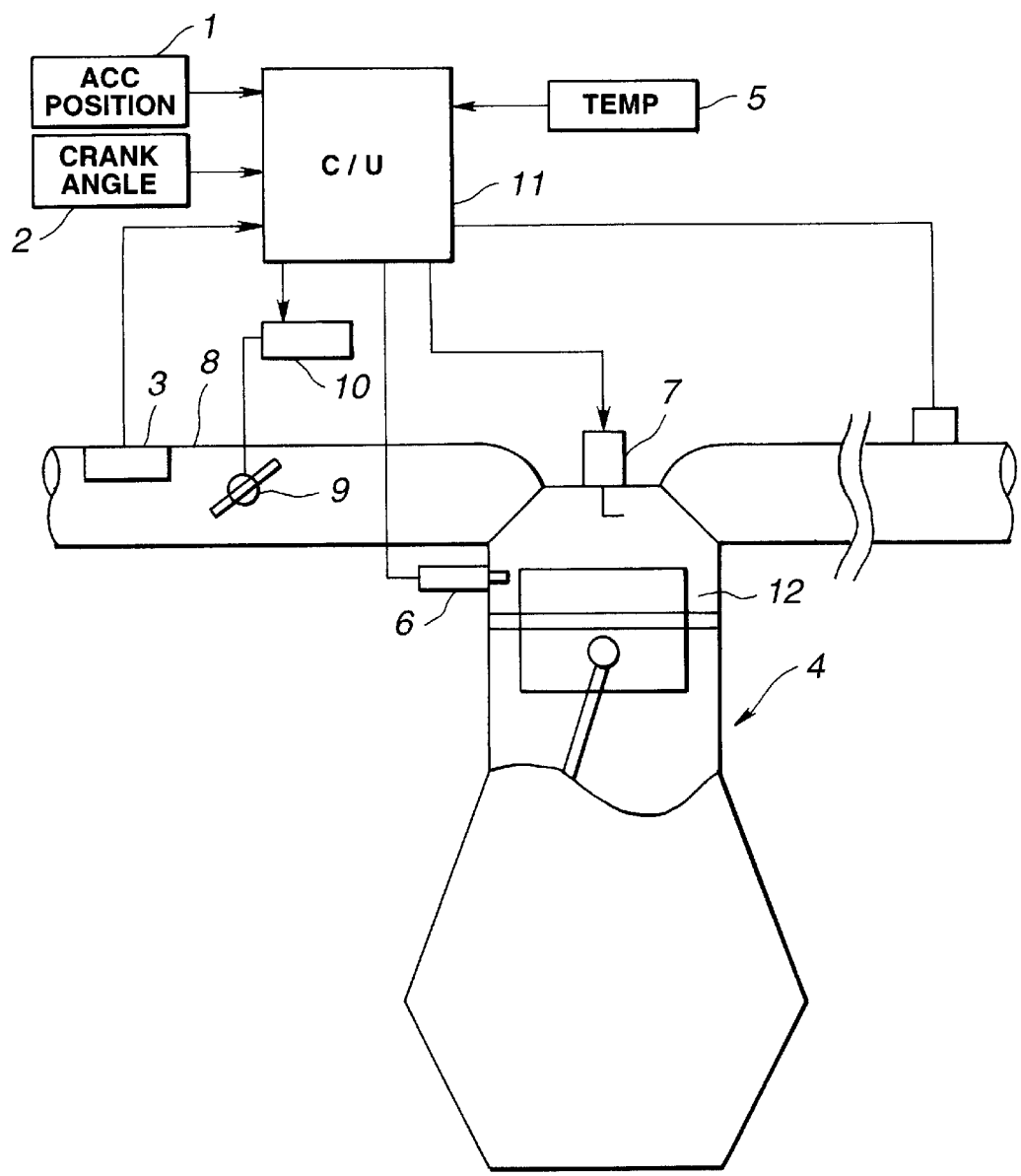
FIG. 1 is a schematic view showing an engine control system according to one embodiment of the present invention.

FIG. 1 shows an engine system or internal combustion engine according to one embodiment of the present invention.

The engine system of FIG. 1 is in the form of an engine control system comprising an input section including a group of input devices, a control section and an output section including output devices serving as actuators.

The input section of this example comprises an accelerator position sensor 1 for sensing a position of an accelerating system of an internal combustion engine 4 (in a sense signifying an engine proper), a crank angle sensor 2, an air flow meter (or air flow sensor) 3 for sensing an intake air quantity per unit time to the engine 4, and a temperature sensor 5 for sensing the temperature of an engine cooling water. The accelerator sensor 1 of this example senses an opening degree (or a depression degree) of an accelerator pedal of a vehicle on which this engine system is mounted. The crank angle sensor 2 of this example periodically produces a position signal POS for every unit crank angle, and a reference signal REF for signaling a reference piston position (BTDC 110° CA, for example) of each cylinder. The control system can determine the engine speed Ne by measuring the number of position signals per unit time, or measuring the period of occurrence of reference signals.

The engine 4 comprises an cylinder block assembly equipped with a fuel injector 6 and a spark plug 7 for each cylinder. The fuel injector 6 of each cylinder injects fuel directly into the combustion chamber 12 of the cylinder in response to a fuel injection control signal, and the spark plug 7 initiates ignition in the combustion chamber 12. The fuel injection system for this engine 4 is arranged to operate the fuel injectors 6 in one of a stratified combustion mode and a homogeneous combustion mode. In low and medium load engine operating regions, the fuel injector 6 of each cylinder injects the fuel into the combustion chamber 12 during the compression stroke to form stratified combustible mixture closely around the spark plug 7 and thereby achieves stratified charge combustion with a very lean air fuel mixture. In a high engine load region, the fuel injector 6 of each cylinder is controlled in the homogeneous combustion mode, and injects fuel into the combustion chamber 12 during the intake stroke to form homogenous mixture over the entirety of the cylinder and thereby achieve homogeneous combustion to provide more power output. The fuel injectors 6 serve as an actuator (or part of an actuator) for controlling the combustion condition in the engine 4. The internal combustion engine 4 of FIG. 1 is a direct injection type spark ignition engine having at least the homogeneous combustion mode and the stratified combustion mode.

A throttle valve 9 is disposed in an intake air passage 8 for the engine 4. A throttle actuator (or throttle control unit) 10 is arranged to electronically control the opening degree of the throttle valve 9.

An engine control unit (or controller) 11 receives signals from the input section to collect input information on engine operating conditions, and controls the opening degree of the throttle valve 9 through the throttle actuator 10, the fuel injection quantity (or fuel supply quantity) and fuel injection timing of each fuel injector 6 and the ignition timing of each spark plug 7 in accordance with the engine operating conditions.

The engine control unit 11 is a main component of the control section. For example, the control unit 11 includes at least one computer including at least a central processing unit (CPU) and a memory section having ROM and RAM.

FIGS. 2~9 show a fuel injection control process performed by the engine control unit 11.

Figure 2:
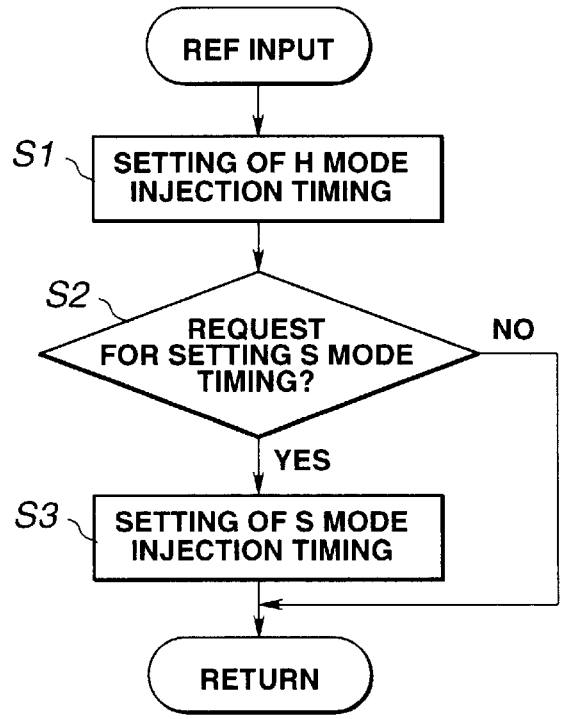
FIGS. 2~9 show a control process performed by the engine control system of FIG. 1.

FIG. 2 shows a basic routine for setting a fuel injection timing I/T. The control unit 11 performs the routine of FIG. 2 each time the control unit 11 receives a reference signal REF from the crank angle sensor 2.

At a step S1, the control unit 11 sets a homogeneous mode fuel injection timing on the intake (or induction) stroke according to the homogeneous combustion mode.

At a step S2, the control unit 11 determines whether there is a request for setting a stratified mode fuel injection timing.

If there is, the control unit 11 proceeds from the step S2 to a step S3, and sets the stratified mode fuel injection timing on the compression stroke according to the stratified combustion mode at the step S3.

If there is no request for setting the stratified injection timing, the control unit 11 terminates this routine without calculating the stratified mode injection timing.

Therefore, the intake stroke injection timing for the homogeneous mode is set irrespective of whether the combustion mode is the homogeneous mode or the stratified mode whereas the compression stroke injection timing for the stratified mode is set only when the setting is requested (and hence the answer of the step S2 is affirmative).

Figure 3:
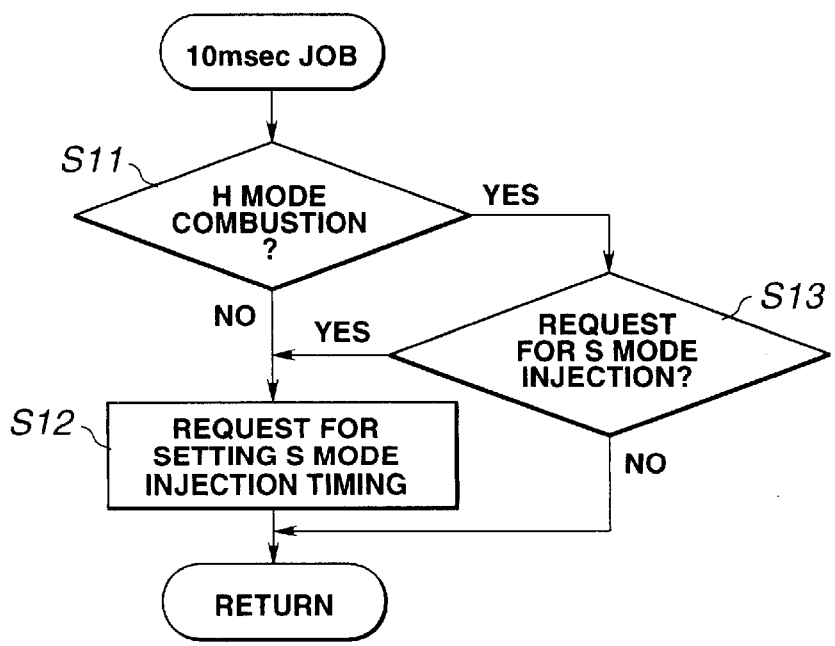

FIG. 3 shows a routine for determining whether there is a request for setting the stratified mode injection timing.

At a step S11, the control unit 11 determines whether a desired target combustion mode is the homogeneous combustion mode or not.

In this example, the control unit 11 determines the target combustion mode in the following manner.

The control unit 11 first determines a desired combustion mode (the homogeneous mode or the stratified mode) and a target equivalent ratio in accordance with engine operating conditions, such as engine speed and engine load, by information retrieval from one or more predetermined maps, for example. The control unit 11 of this example uses the engine speed and the engine load as basic parameters for determining the desired combustion mode and the target equivalent ratio, and further uses one or more other engine operating conditions such as the engine cooling water temperature, as secondary parameter. When the target equivalent ratio is changed in a step-like manner like a step change in response to a change in the engine operating conditions requiring a changeover of the combustion mode between the stratified combustion mode and the homogeneous combustion mode, it is not possible to change the actual equivalent ratio for the engine immediately because of a lag in change of the intake air quantity due to a lag in movement of the throttle valve 9 and a lag attributable to the volume of the intake system. Therefore, the control system of this example determines a delayed target equivalent ratio (TFBYAD) by performing a phase-delay correction on the target equivalent ratio so as to keep pace with the lagging change of the intake air quantity, and varies the engine output torque smoothly by using the delay corrected (delayed) equivalent ratio. Furthermore, the control system of this example allows a changeover of the combustion mode when the delayed equivalent ratio is in a predetermined (overlap) region, to ensure a stable combustion both before and after the changeover of the combustion mode between the stratified mode and the homogeneous mode. In this region, the desired equivalent ratio for the homogeneous mode and the desired equivalent ratio for the stratified mode overlap each other. In this example, the control system selects one of the homogeneous combustion mode and the stratified combustion mode, by comparing the delayed equivalent ratio with a predetermined threshold defining a region suitable for the changeover of the combustion mode. For example, the control system selects, as a target combustion mode, the homogeneous mode when the delayed equivalent ratio is higher than or equal to the threshold (TFACH), and selects the stratified combustion mode when the delayed equivalent ratio is lower than the threshold (TFACH). For example, the engine control unit 11 produces a select signal in a signal state (corresponding to the affirmative answer YES of the step S11) to select the homogeneous mode when an engine operating parameter indicative of the engine load is varied from a region (such as a low or medium load region) requiring the stratified combustion mode, to a region (such as a high load region) requiring the homogeneous combustion mode, and the delayed equivalent ratio enters a predetermined range allowing a changeover from the stratified mode to the homogeneous mode.

When the target combustion mode is the stratified combustion mode, then the control unit 11 proceeds from the step S11 directly to a step S12. The control unit 11 produces, at the step S12, a request signal requesting the setting of the stratified mode injection timing in the step S3. When the stratified mode is selected as the target combustion mode, the stratified charge combustion is feasible for all the cylinders, and therefore, the control system immediately requests the setting of the stratified mode injection timing.

When the target combustion mode is the homogeneous combustion mode, then the control unit 11 proceeds from the step S11 to a step S13 to determine whether there remains a request for the stratified mode fuel injection to any one or more of the cylinders of the engine 4. If there remains, the control unit 11 proceeds from the step S13 to the step S12 to request the setting of the stratified mode injection timing. If none of the cylinders requests the stratified mode injection, then the control unit 11 terminates the routine of FIG. 3 without producing the request signal for requesting the stratified mode injection timing setting.

In a combustion changeover from the homogeneous mode to the stratified mode, the fuel injection timing is changed in a retarding direction. Therefore, the control system can carry out the stratified mode fuel injection from the first compression stroke after the combustion changeover. When the target combustion mode is the stratified mode, therefore, it suffices to calculate only the stratified mode injection timing even in a transient state immediately after the combustion changeover from the homogeneous mode.

In the case of a combustion changeover from the stratified mode to the homogeneous mode, by contrast, the fuel injection timing is changed in an advancing direction. The control system according to this embodiment, therefore, assumes that the need for calculating the stratified mode injection timing does not disappear immediately after the combustion changeover to the homogeneous mode. The control system continues the stratified mode fuel injection on the compression stroke to one or more cylinders transiently after the combustion changeover to the homogeneous mode. When the stratified mode injection is needed by one or more cylinders, the control unit 11 produces the request signal requesting the setting of the stratified mode injection timing even after the target combustion mode is changed to the homogeneous mode.

The control system may be arranged to monitor engine operating conditions such as the engine load and the engine speed, and to judge whether there is a request for setting the stratified mode injection timing, in accordance with the engine operating conditions. Alternatively, the control system may be arranged to determine whether to produce the request signal, only by checking the request of each cylinder for the stratified mode fuel injection.

Figure 4:
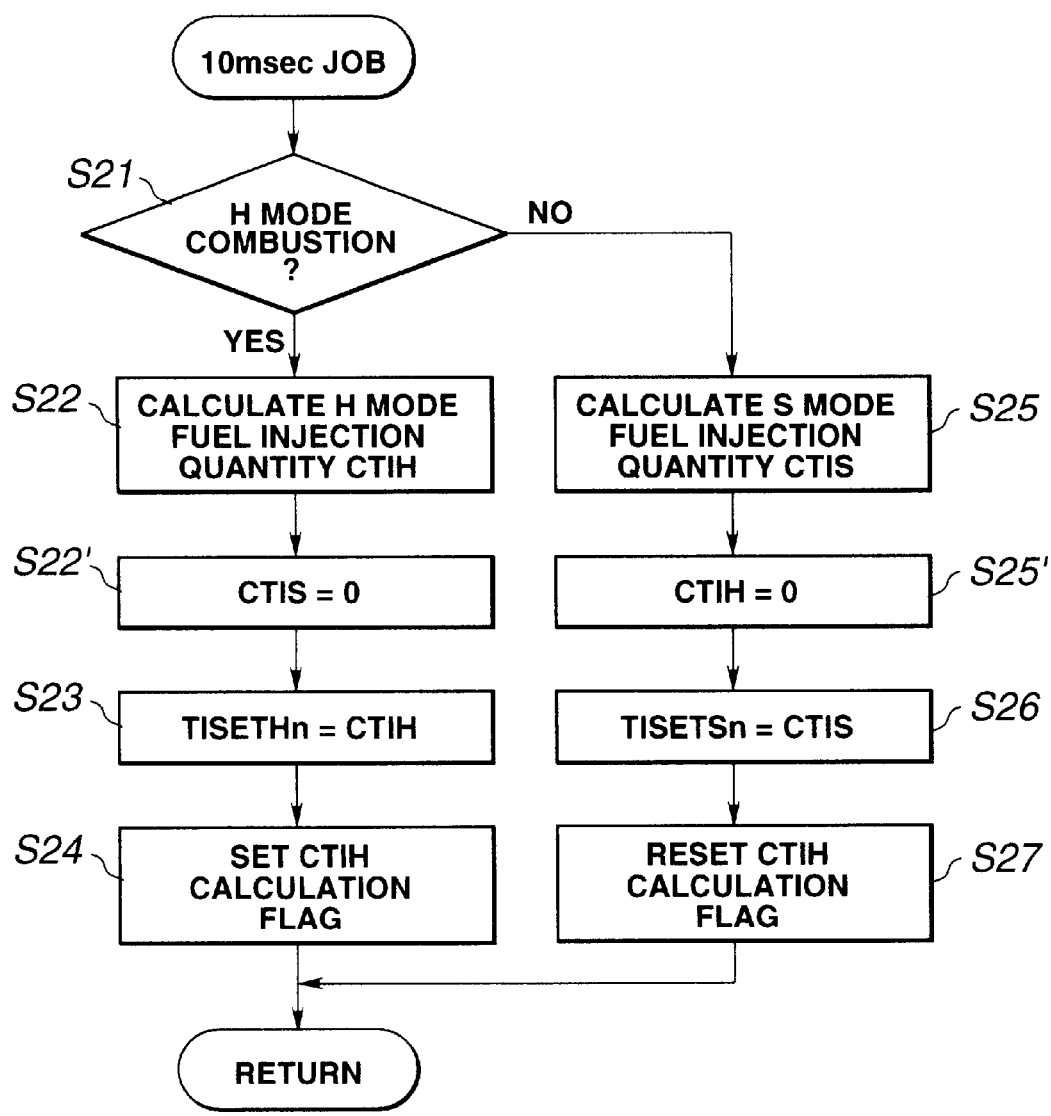
Figure 12:
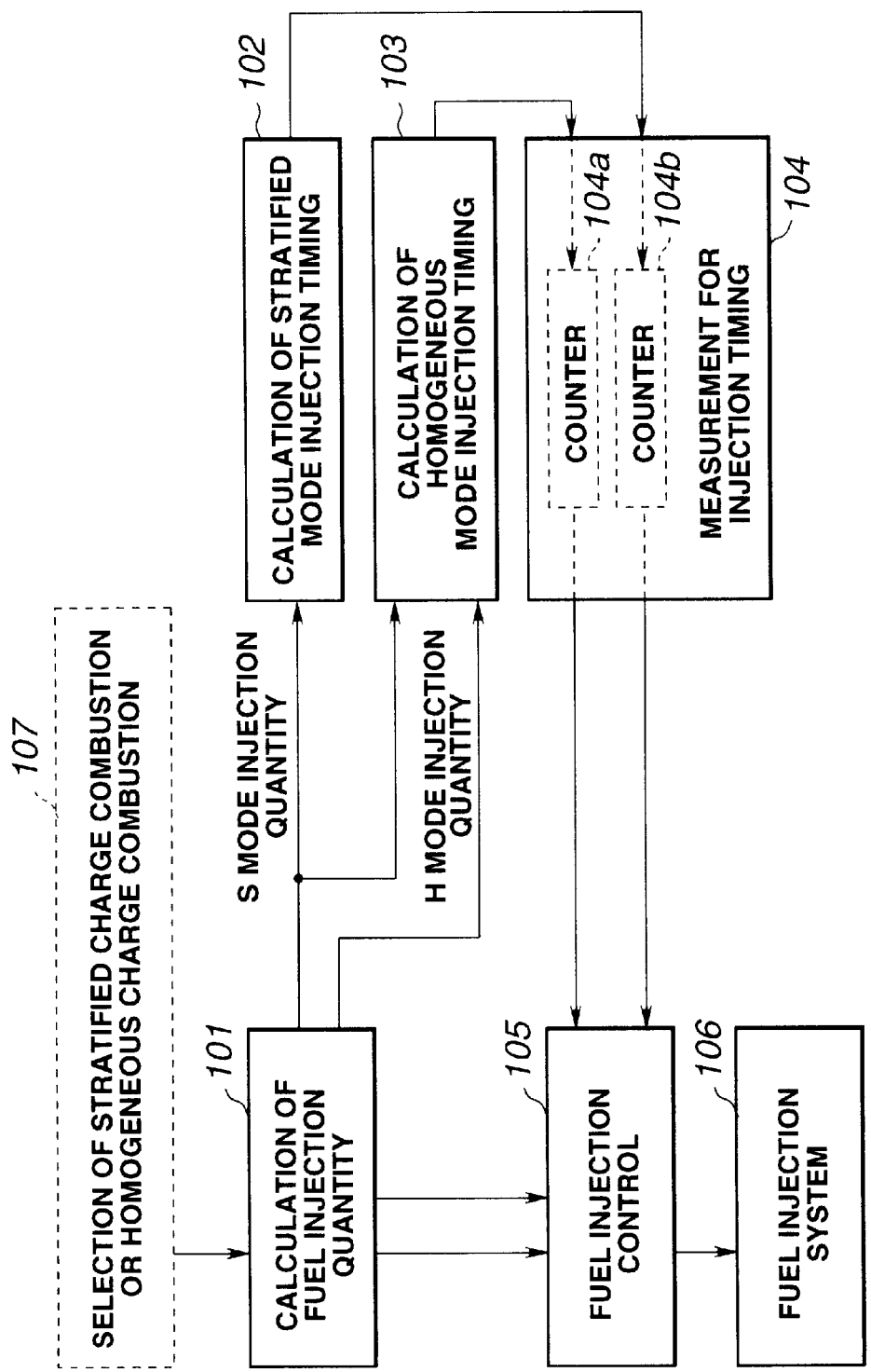
FIG. 12 is a block diagram showing, as an example, an arrangement of functional sections which the control system shown in FIG. 1 can have.

FIG. 4 shows a fuel injection quantity calculating routine (corresponding to a fuel injection quantity calculating section 101 of FIG. 12). The control unit 11 periodically performs the flow of FIG. 4 at regular time intervals of a predetermined time length (every 10 msec, for example).

At a step S21, the control unit 11 determines whether the target combustion mode is the homogeneous mode or not.

When the homogeneous combustion is the target, the control unit 11 proceeds from the step S21 to a step S22, and calculates a fuel injection quantity CTIH according to the homogeneous combustion mode.

In this example, the homogeneous mode fuel injection quantity CTIH is calculated in the following manner. First, from the engine speed Ne and the actual intake air quantity Q sensed by the air flow meter 3, the control unit 11 calculates a basic fuel injection quantity Tp (Tp=k·Q/Ne; k is a constant). The basic fuel injection quantity Tp is a fuel quantity at a standard equivalent ratio {of a value (=1) corresponding to the theoretical air fuel ratio, normally}. The basic injection quantity Tp is w then modified by the above-mentioned phase delayed target equivalent ratio TFBYAD, a correction coefficient THOS determined from an engine operating condition such as the cooling water temperature, a combustion efficiency factor (or combustion efficiency correction coefficient) ITAF, and a battery voltage correction quantity Ts, according to the following equation.

$$CTIH = Tp \cdot TFBYAD \cdot THOS \cdot ITAFH + Ts$$

In this equation, the combustion efficiency factor ITAF is set equal to a homogeneous mode combustion efficiency factor ITFAH. The combustion efficiency is variable in dependence on the target equivalent ratio and an EGR rate (exhaust gas recirculation rate). Furthermore, the combustion efficiency is affected by the combustion mode. Therefore, the control unit 11 determines the combustion efficiency factor ITAF in accordance with the target equivalent ratio and the EGR rate, as parameters, by using one of a map for the homogeneous mode and a map for the stratified mode. At the step S22, the control unit 11 determines the homogeneous mode combustion efficiency factor ITFAH by using the map of the homogeneous mode and uses it for determining CTIH. Thus, the combustion efficiency is different between the homogeneous charge combustion and the stratified charge combustion, and hence the control system calculates the fuel injection quantity for each of the combustion modes separately from the other. The control system according to this embodiment of the present invention is arranged to calculate only the fuel injection quantity of the selected combustion mode. This arrangement can reduce the load of calculation (or computation), as compared to the system arranged to always calculate both the fuel injection quantity for the homogeneous mode and the fuel injection quantity for the stratified mode.

At a step S22', the control unit 11 sets a stratified mode fuel injection quantity CTIS equal to zero.

At a step S23, the control unit 11 sets the fuel injection quantity CTIH calculated at the step S22 as a next homogeneous mode fuel injection quantity TISETHn for the #n cylinder scheduled to receive a next fuel injection.

At a step S24, the control unit 11 sets a CTIH calculation flag FCTIH (condition signal) to indicate that the calculation of the homogeneous mode fuel injection quantity CTIH is finished.

When the target is the stratified combustion, the control unit 11 proceeds from the step S21 to a step S25. At the step S25, the control unit 11 calculates the stratified mode fuel injection quantity CTIS according to the stratified combustion mode in the same manner as the calculation of the homogeneous mode injection quantity CTIH. In the calculation of CTIS, the control unit 11 uses a stratified mode combustion efficiency factor ITAFS determined by the map for the stratified combustion mode, instead of the homogeneous mode efficiency factor ITAFH.

At a step S25', the homogeneous mode fuel injection quantity is set equal to zero.

At a step S26, the control unit 11 sets the stratified mode fuel injection quantity CTIS, as a stratified mode fuel injection quantity TISETSn for the corresponding cylinder.

At a step S27, the control unit 11 resets the CTIH calculation flag FCTIH to indicate that the calculation of the homogeneous mode fuel injection quantity CTIH is not finished.

Figure 5:
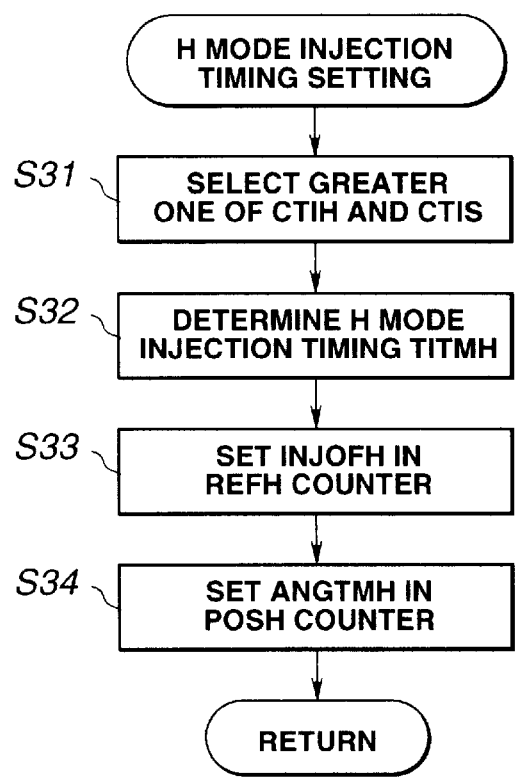

FIG. 5 shows a subroutine (of the step S1 in FIG. 2) for setting the fuel injection timing for the homogeneous combustion mode (corresponding to a homogeneous mode injection timing calculating section 103 of FIG. 12).

At a step S31, the control unit 11 selects a greater one of the homogeneous mode fuel injection quantity CTIH and the stratified mode fuel injection quantity CTIS.

The control system of this example calculates only the fuel injection quantity of the selected combustion mode and holds the fuel injection quantity of the non-selected combustion mode equal to zero. When the target combustion mode is the homogeneous mode, only the homogeneous mode fuel quantity CTIH is calculated whereas the stratified mode quantity CTIS is set equal to zero. When the target combustion mode is the stratified mode, only the stratified mode fuel quantity CTIS is calculated and the homogeneous mode quantity CTIH is set equal to zero. At the step S31, therefore, the control unit 11 selects the homogeneous mode fuel injection quantity CTIH during the period of the homogeneous combustion mode, and selects the stratified mode fuel injection quantity CTIS during the period of the stratified combustion mode.

At a step S32, the control unit 11 determines a homogeneous mode fuel injection timing TITMH in the form of the crank angle (or angular distance) from a current reference signal REF to the instant of fuel injection, by retrieval from a map having the fuel injection quantity and the engine speed Ne as parameters. The control unit 11 uses the fuel injection quantity selected at the step S31, and the engine speed Ne as the parameters for determining the homogeneous mode fuel injection timing TITMH.

When the target mode is the stratified mode, therefore, the control system uses the stratified mode injection quantity CTIS for determining the homogeneous mode injection timing TITMH. Thus, this control system calculates the homogeneous mode injection timing during the stratified mode, and prepares for a combustion changeover to the homogeneous mode, without increasing the load for computing the fuel injection quantity.

The stratified mode injection quantity CTIS required to produce a predetermined engine torque is not equal to the homogeneous mode injection quantity CTIH for the same engine torque because of the difference in the combustion efficiency corresponding to the equivalent ratio between the stratified combustion mode and the homogeneous combustion mode. This difference in the injection quantity between the stratified mode and the homogeneous mode causes a shift in the fuel injection timing. However, the shift in the fuel injection timing is sufficiently small, so that the control system can maintain the normal and sound combustion despite the calculation of the homogeneous mode injection timing based on the stratified mode injection quantity.

At a step S33, the control unit 11 sets the number INJOFH of reference signals REF to be counted from the current (or most recent) reference signal REF to the correct instant of fuel injection according to the homogeneous mode injection timing TITMH, in a REFH counter.

At a step S34, the control unit 11 sets a crank angle ANGTMH from the last reference signal REF to be counted by the above-mentioned REFH counter, to the instant of the fuel injection according to the homogeneous mode fuel injection timing TITMH, in a POSH counter for counting down, one by one upon receipt of each position signal POS, up to the firing of the corresponding injector.

Figure 6:
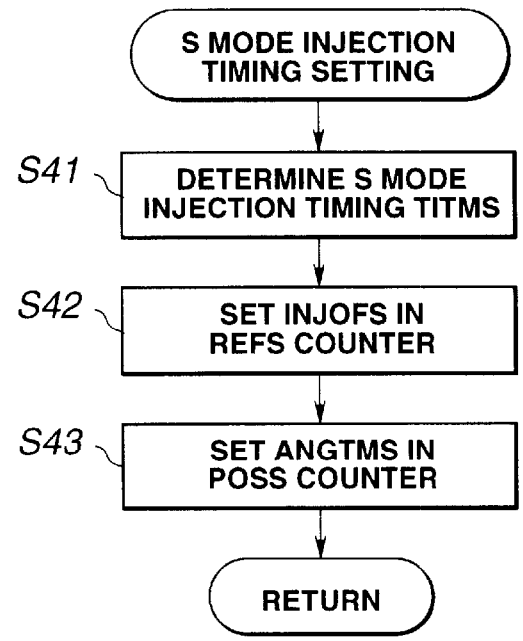

FIG. 6 shows a subroutine (of the step S3 shown in FIG. 2) for setting the fuel injection timing for the stratified combustion mode (corresponding to a stratified mode injection timing calculating section 102 of FIG. 12).

At a step S41, the control unit 11 determines a stratified mode fuel injection timing TITMS in the form of a crank angle (or angular distance) from the current reference signal REF to the instant of fuel injection, by retrieval from a map having the stratified mode fuel injection quantity CTIS and the engine speed Ne as parameters.

At a step S42, the control unit 11 sets the number INJOFS of reference signals REF to be counted from the current reference signal REF to the instant of the fuel injection according to the stratified mode timing TITMS, in a REFS counter.

At a step S43, the control unit 11 sets a crank angle ANGTMS from the last reference signal REF to be counted by the above-mentioned REFS counter, to the instant of the stratified mode fuel injection timing TITMS, in a POSS counter.

In this example, the control system has the REF counter for counting reference signals REF and the POS counter for counting position signals POS for each of the stratified combustion mode and the homogeneous combustion mode. Therefore, the control system can perform the measuring operation for determining the stratified mode injection timing and the measuring operation for determining the homogeneous mode injection timing in parallel.

Figure 7:
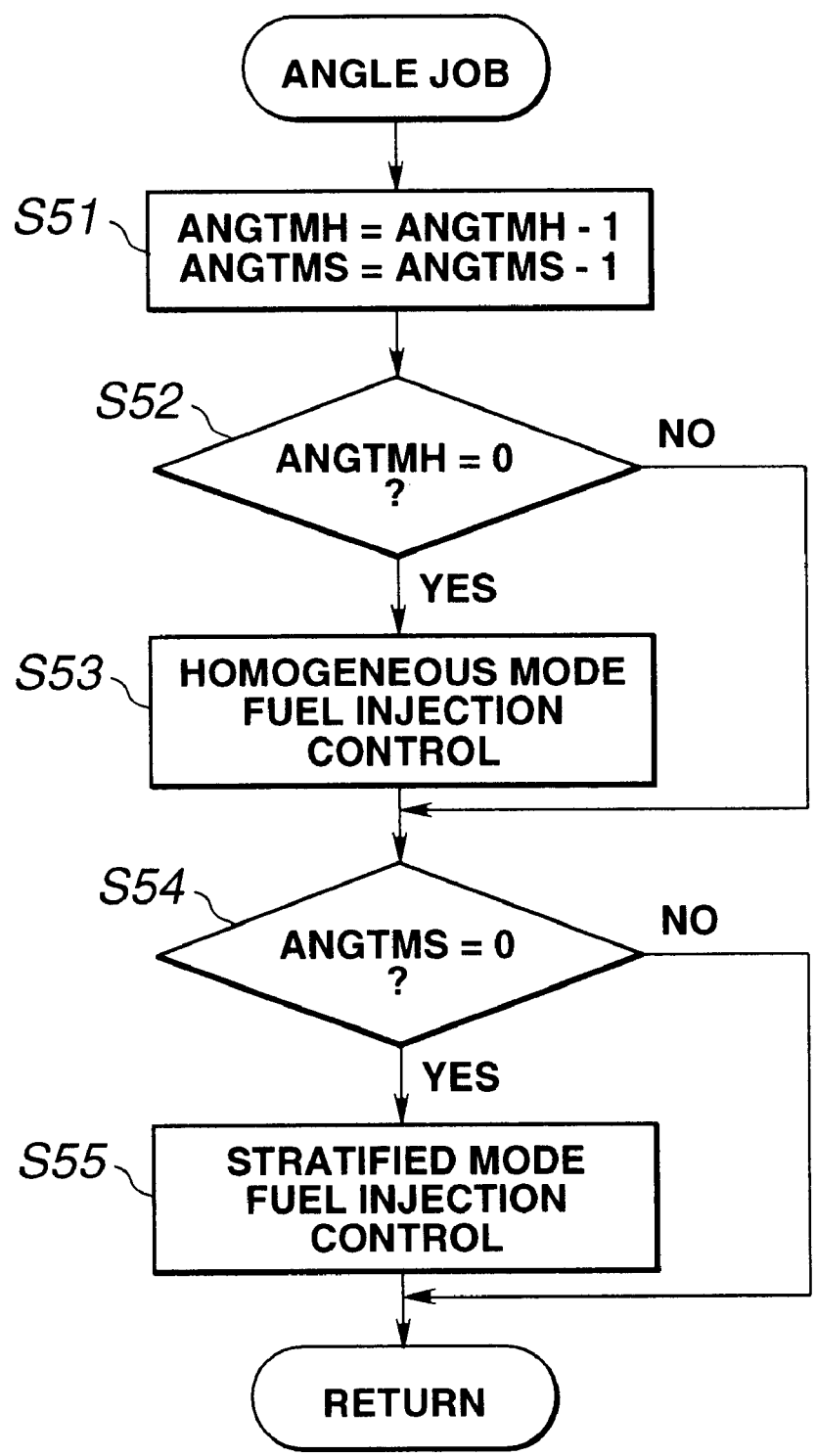

FIG. 7 shows a routine for measuring the fuel injection start timing for each combustion mode (corresponding to a measuring section 104 shown in FIG. 12). This routine is carried out at regular intervals of a unit crank angle (every 1 degree).

At a step S51, the controller decrements each of the crank angle ANGTMH in the POSH counter, and the crank angle ANGTMS in the POSS counter. The crank angle ANGTMH in the POSH counter represents a crank angle remaining before the instant of injection specified by the homogeneous mode injection timing. The crank angle ANGTMS in the POSS counter represents a crank angle remaining before the instant of injection specified by the stratified mode injection timing.

At a step S52, the control unit 11 determines whether the remaining crank angle ANGTMH becomes equal to zero.

Figure 8:
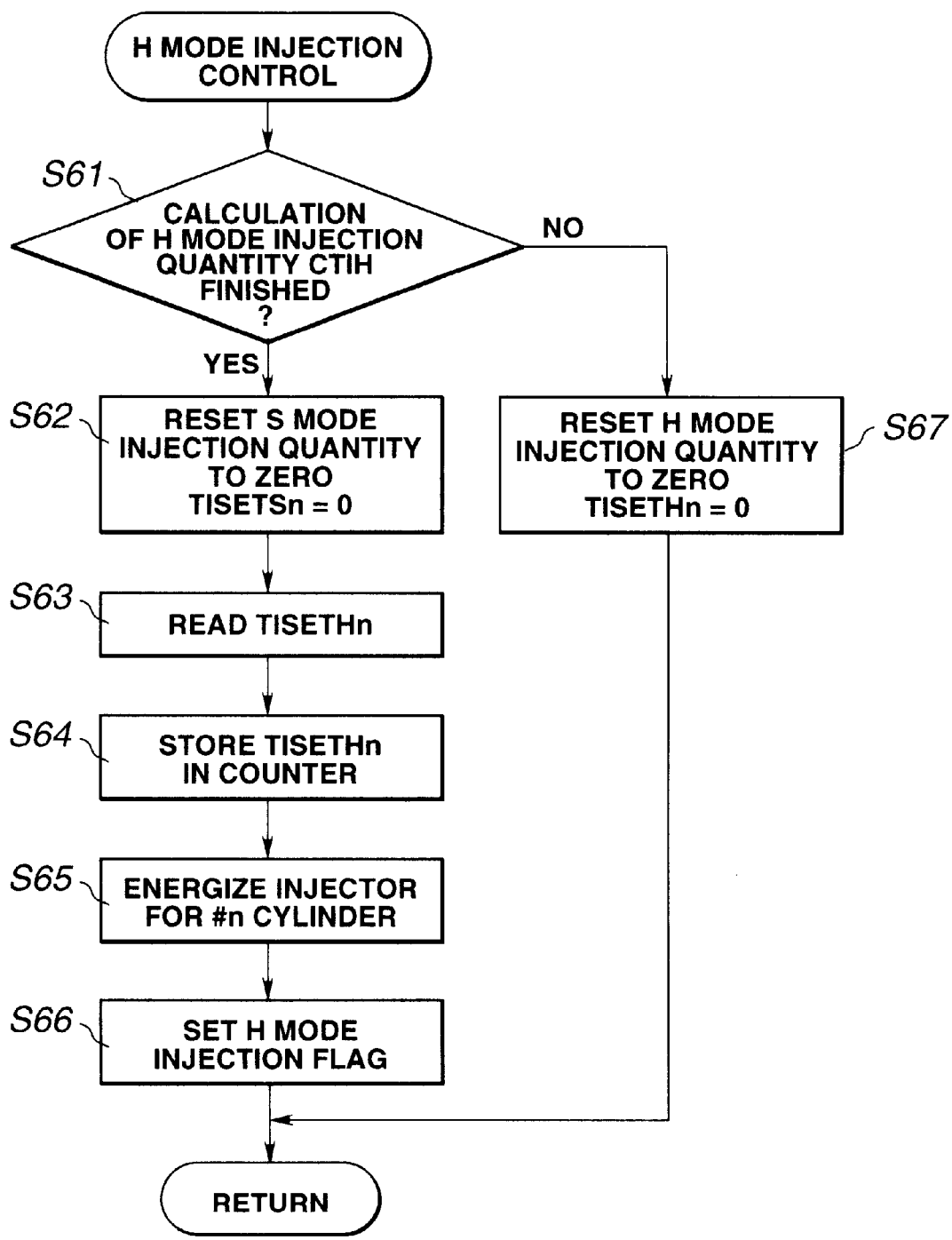

When the remaining crank angle ANGTMH is equal to zero, then the control unit 11 proceeds from the step S52 to a step S53 and carries out a homogeneous mode fuel injection at the step S53 (as shown in FIG. 8).

When the crank angle ANGTMH is not equal to zero, then the control unit 11 proceeds from the step S52 to a step S54. Alternatively, the control unit 11 proceeds to the step S54 after the step S53. At the step S54, the control unit 11 determines whether the remaining crank angle ANGTMS becomes equal to zero.

Figure 9:
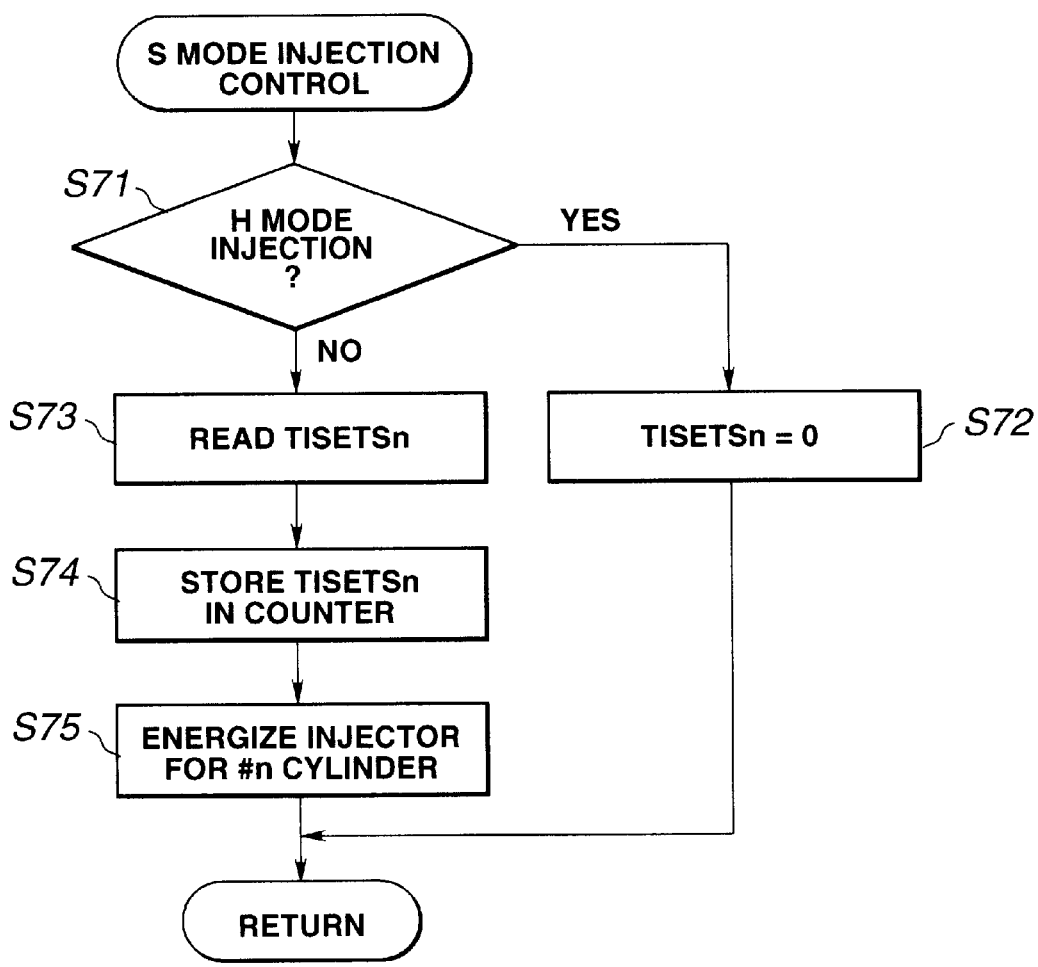

When the crank angle ANGTMS is equal to zero, the control unit 11 proceeds from the step S54 to a step S55 and carries out a stratified mode fuel injection at the step 55 (as shown in FIG. 9).

In this example, as mentioned later, the control system does not carry out a fuel injection to a given cylinder at the homogeneous mode or stratified mode injection timing if the corresponding fuel injection quantity is zero.

FIG. 8 shows the routine of the homogeneous mode fuel injection control of the step S53 shown in FIG. 7 (corresponding to a fuel injection control section 105 of FIG. 12).

At a step S61, the control unit 11 determines whether the calculation of the homogeneous mode fuel injection quantity CITH is finished or not, by checking the above-mentioned CITH calculation flag FCTIH (set or reset at the step S24 or S27).

When the calculation of the homogeneous mode fuel injection quantity CITH is already finished, and hence the flag FCTIH is in the set state, the control unit 11 proceeds from the step S61 to a step S62. At the step S62, the control unit 11 stops the stratified combustion by resetting the stratified mode fuel injection quantity TISETSn for the corresponding #n cylinder, to zero.

Then, at a step S63, the control unit 11 reads the homogeneous mode fuel injection quantity TISETHn.

At a step S64, the control unit 11 stores the homogeneous mode fuel injection quantity TISETHn (represented by the pulse width) in a counter INJCNT for measuring an on time of the fuel injector (valve).

At a step S65, the control system starts energizing the fuel injector for the corresponding #n cylinder. Therefore, the injector injects the fuel in the quantity corresponding to TISETHn into the #n cylinder. Thus, the control system carries out the homogeneous combustion.

At a step S66, the control unit 11 sets a homogeneous mode injection flag FHOMO (condition signal) to indicate that the homogeneous mode fuel injection has been carried out by energizing the corresponding injector during the time stored in the counter INJCNT.

When the calculation of the homogeneous mode fuel injection quantity CITH is not yet finished (that is, the calculation is not yet started, or the calculation is still in progress) by the homogeneous mode injection timing, the control unit 11 proceeds from the step S61 to a step S67, and resets the homogeneous mode fuel injection quantity TISETHn for the #n cylinder to zero at the step S67. Thus, the control system suspends the changeover from the stratified mode to the homogeneous mode to a given cylinder of the engine if the homogeneous mode fuel injecting timing for the given cylinder is reached before the completion of the calculation of the homogeneous mode fuel injection quantity.

FIG. 9 shows the routine of the stratified mode fuel injection control of the step S55 (corresponding to the fuel injection control section 105 of FIG. 12).

At a step S71, the control unit 11 determines whether the homogeneous mode fuel injection on the intake stroke has been carried out or not, by checking the above-mentioned homogeneous mode injection flag FHOMO.

When the homogeneous mode fuel injection is already carried out, and hence the homogeneous mode injection flag FHOMO is in the set state, the control unit 11 proceeds from the step S71 to a step S72. At the step S72, the control unit 11 resets the stratified mode fuel injection quantity TISETSn for the corresponding #n cylinder, to zero, and thereby prevents the stratified mode fuel injection. In this way, the control system can prevent undesired enrichment of the air fuel mixture due to double fuel injection. Even after a changeover of the target combustion mode from the stratified mode to the homogeneous mode, the control unit 11 keeps the stratified mode fuel injection quantity TISETSn and performs a stratified mode fuel injection based on the stored stratified mode fuel injection quantity TISETSn calculated before the combustion changeover.

When the homogeneous mode fuel injection is not carried out, and hence the homogeneous mode injection flag FHOMO remains in the reset state, the control unit 11 proceeds from the step S71 to a step S73 and reads the stratified mode fuel injection quantity TISETSn for the corresponding #n cylinder. In the case of a combustion changeover from the homogeneous mode to the stratified mode, there is sufficient time for calculating the stratified mode injection quantity from stoppage of an intake stroke fuel injection to a compression stroke injection timing.

Then, at a step S74, the control unit 11 stores the stratified mode fuel injection quantity TISETSn in the counter for measuring the on time of the fuel injector.

At a step S75, the control system starts energizing the fuel injector for the corresponding #n cylinder. The injector injects the fuel in the quantity corresponding to TISETSn into the #n cylinder. The control system carries out the stratified combustion.

The control system of this example calculates only the homogeneous mode injection quantity and the homogeneous mode injection timing during the operation in the homogeneous mode, so that the load of calculation is lessened. In the case of a combustion changeover from the homogeneous mode to the stratified mode, the control system can timely calculate the stratified mode injection timing after the decision of the changeover since the stratified mode injection timing on the compression stroke is sufficiently later than the homogeneous mode injection timing on the intake stroke.

Moreover, the control system is arranged to perform a combustion changeover from the stratified mode to the homogeneous mode promptly and smoothly. A fuel injection to a cylinder is prepared by calculating the injection timing, waiting for a next reference signal and setting the calculated injection timing in the counter upon receipt of the next reference signal. These operations take a considerable amount of time, and tend to cause a delay in a changeover from the stratified mode to the homogeneous mode. However, the control system according to the embodiment of the invention always calculates the homogeneous mode injection timing and sets the counter for the homogeneous mode in accordance with the result of the calculation. Therefore, even if a decision is made to change the combustion mode from the stratified mode to the homogeneous mode during progress of countdown by the counter, the control system can achieve the homogeneous mode fuel injection timely by injecting the fuel in the homogeneous mode injection quantity at the homogeneous mode injection timing.

The injection timing is determined in accordance with the injection quantity. In calculating the homogeneous mode injection timing during the period of the stratified charge combustion, the control system according to the illustrated embodiment of the invention substitutes the stratified mode injection quantity for the homogeneous mode injection quantity. The control system lightens the burden on the computer system by omitting the calculation of the homogeneous mode injection quantity during the period of the stratified mode.

The step S31 of FIG. 5 is arranged to select the greater of the stratified mode injection quantity CTIS and the homogeneous mode injection quantity CTIH. Alternatively, it is possible to arrange the step S31 to select one of CTIS and CTIH by checking the target combustion mode. In this case, the control unit 11 selects, as the injection quantity used for calculating the homogeneous mode injection timing TITMH, the homogeneous mode injection quantity CTIH when the target combustion mode is the homogeneous mode, and selects the stratified mode injection quantity CTIS when the target combustion mode is the stratified mode.

Figure 10:
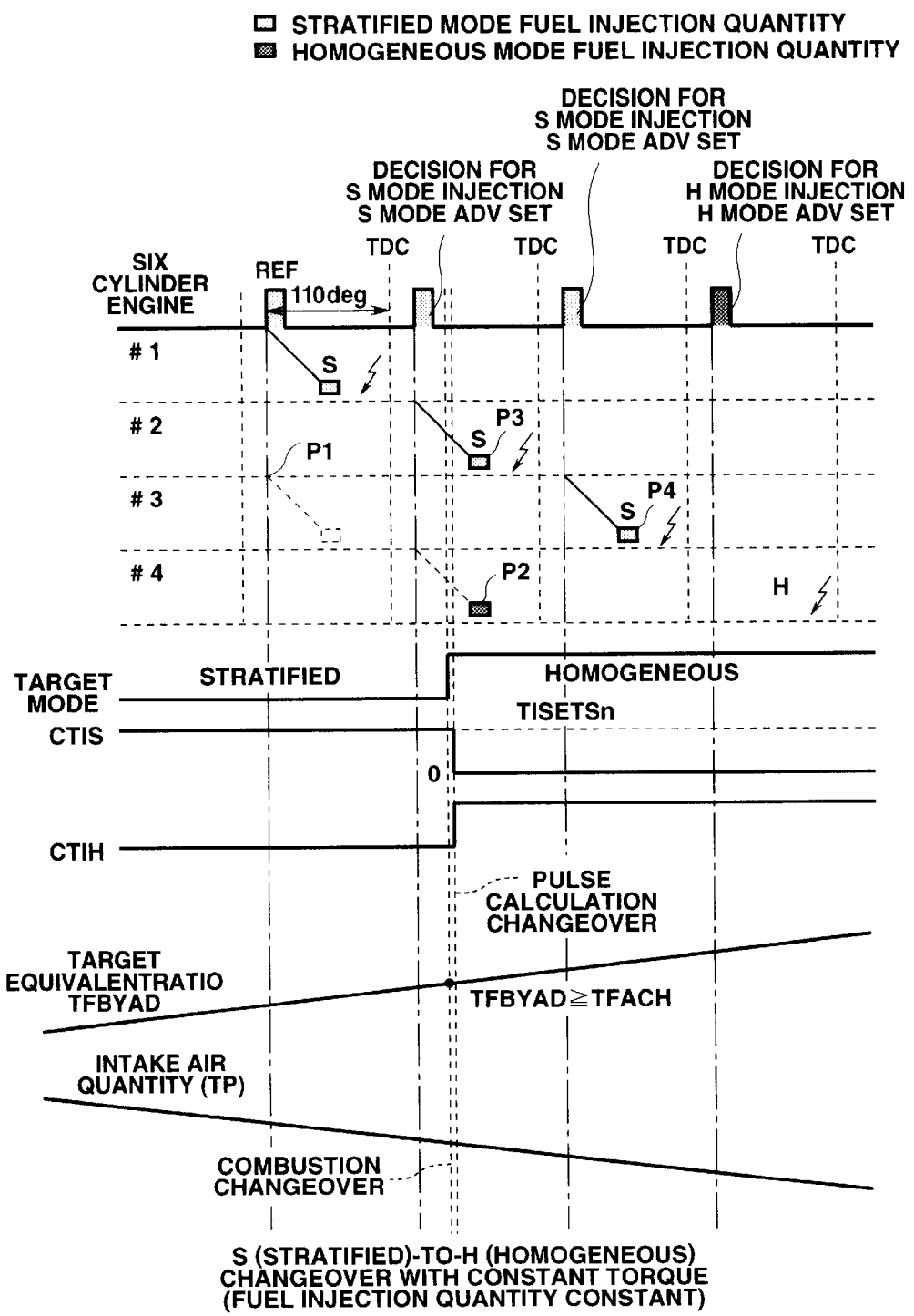
FIG. 10 is a time chart showing a sequence of events occurring in the control system of FIG. 1 in transition from the stratified combustion mode to the homogeneous combustion mode.
Figure 11:
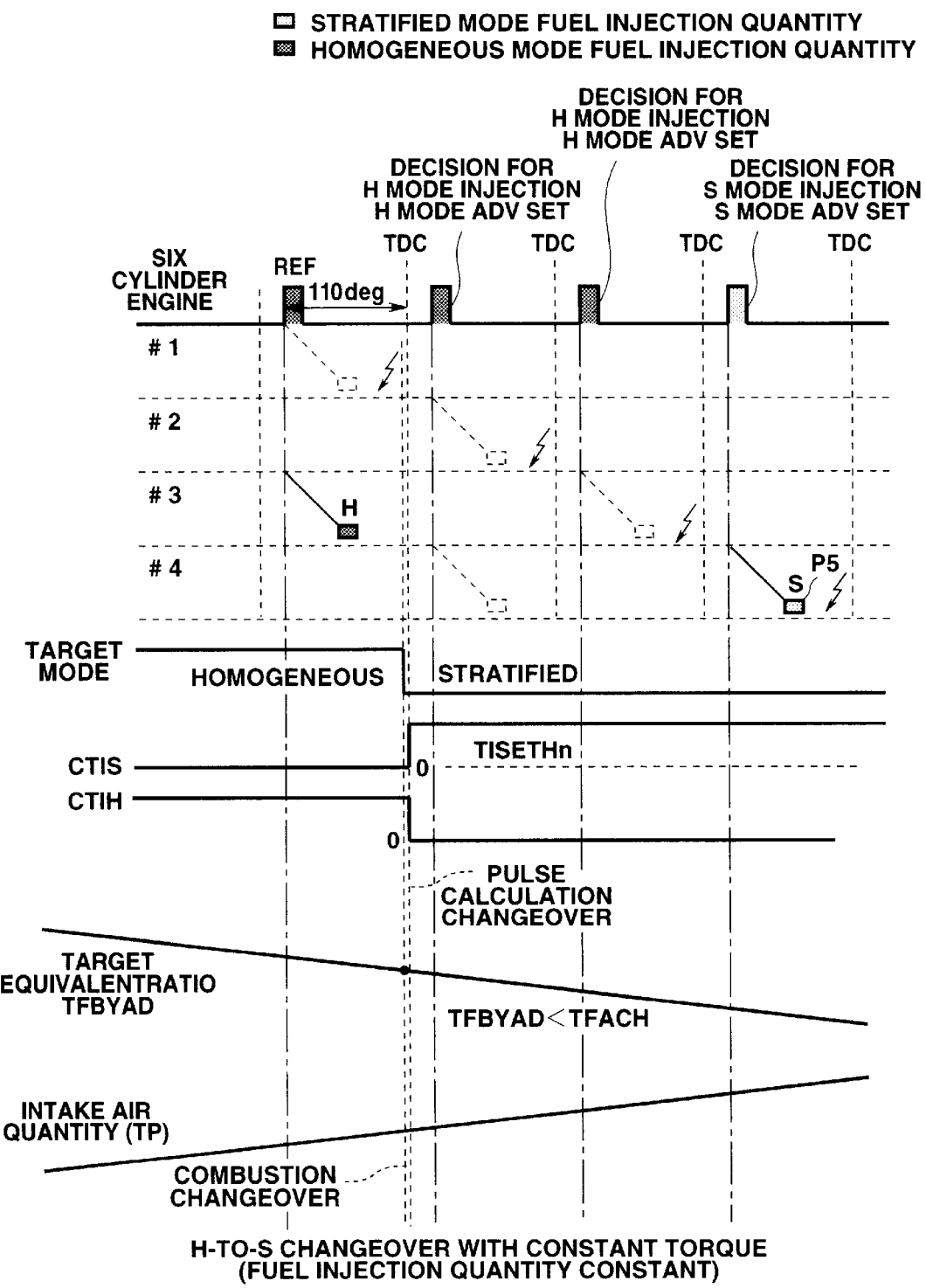
FIG. 11 is a time chart showing a sequence of events occurring in the control system of FIG. 1 in transition from the homogeneous combustion mode to the stratified combustion mode.

FIGS. 10 and 11 are time charts for illustrating operations of this control system.

FIG. 10 shows behavior in changeover from the stratified charge combustion to the homogeneous charge combustion.

During the period of the stratified charge combustion mode, the control system sets the counter for the stratified mode in accordance with the stratified mode injection timing TITMS in response to each input of a reference signal REF, and carries out a stratified mode fuel injection to the corresponding cylinder due for injection when the count is reduced to zero. At the same time, the control system calculates the homogeneous mode injection timing TITMH, sets the counter for the homogeneous mode in accordance with the homogeneous mode injection timing TITMH (at p1 shown in FIG. 10) and starts the countdown in preparation for a changeover to the homogeneous mode. In this case, however, the homogeneous mode fuel injection quantity TISETHn for each cylinder is zero, and therefore the control system does not perform a homogeneous mode fuel injection.

When a changeover from the stratified mode to the homogeneous mode is requested and decided, the control system calculates the homogeneous mode injection quantity TISETHn in accordance with most recent values of the engine operating conditions. After completion of the calculation of the homogeneous mode injection quantity TISETHn, the control system carries out the homogeneous fuel injection in order from the cylinder (the #4 cylinder in the example of FIG. 10) which has first reached the point of the homogeneous mode injection timing. As to the #4 cylinder, the calculation and counter setting for the homogeneous mode injection timing are done before the changeover of the target mode to the homogeneous mode. Therefore, after the changeover to the homogeneous mode, the control system becomes ready for the homogeneous charge combustion merely by calculating the homogeneous mode injection quantity, and performs the homogeneous mode fuel injection (at p2) in time. The control system can change the combustion mode to the homogeneous mode promptly.

As to the cylinder or cylinders (the #2 and #3 cylinders in the example of FIG. 10) to which the homogeneous mode injection timing on the intake stroke is past, but the stratified mode injection timing on the compression stroke of the current operating cycle is forthcoming, the control system performs fuel injection at the stratified mode injecting timing on the compression stroke. The fuel injection quantity of this stratified mode injection is set equal to the magnitude of the stratified mode fuel injection quantity calculated before the changeover to the homogeneous mode.

The control system according to this embodiment continues the calculation of the stratified mode injection timing during a transient period after a changeover of the target mode to the homogeneous mode as long as the stratified mode injection is needed by any one or more of the cylinders. The control system is arranged to monitor each of the engine cylinders, and continue the stratified mode fuel injection timing calculation until each of the engine cylinders reaches a predetermined state allowing stoppage of the calculation of the stratified mode injection timing. The control system may be arranged to continue the calculation of the stratified mode injection timing until a homogeneous mode fuel injection is performed to each of the cylinders, or until an ignition timing for the homogeneous charge combustion mode is set, or until a first homogeneous mode combustion is performed. In the illustrated embodiment, the transient period during which the calculation of the stratified mode injection timing is continued is equal to or shorter than one engine operating cycle of the engine.

FIG. 11 shows behavior in the case of changeover from the homogeneous combustion to the stratified combustion. After the decision to change over the target mode from the homogeneous mode to the stratified mode, the control system can achieve the transition to the stratified mode immediately. For one or more cylinders to which a homogeneous mode fuel injection is not yet performed, and hence a stratified mode injection is allowed (the #4 and #1 cylinders in the example of FIG. 11), the control system calculates the stratified mode injection timing and the stratified mode injection quantity TISETSn and then performs a stratified mode fuel injection on the compression stroke (at p5).

In the illustrated embodiment, the control system comprises the following sections as shown in FIG. 12.

A fuel quantity calculating section 101 calculates only one of the homogeneous mode fuel injection quantity (CTIH) and the stratified mode fuel injection quantity (CTIS) in accordance with the target combustion mode.

A stratified mode injection timing calculating section 102 calculates the stratified mode injection timing (TITMS) in accordance with the stratified mode injection quantity (CTIS) when the stratified mode is selected A homogeneous mode injecting timing calculating section 103 calculates the homogenous mode injection timing (TITMH) in accordance with the homogeneous mode injection quantity when the homogeneous mode is selected and for calculating the homogenous mode injection timing (TITMH) in accordance with the stratified mode injection quantity when the stratified mode is selected.

A measuring section 104 signals a first injection time defined by the homogenous mode injection timing and a second injection time defined by the stratified mode injection timing.

A fuel injection controlling section 105 carries out either of a homogeneous mode fuel injection at the first injection time on the intake stroke and a stratified mode fuel injection at the second injection time on the compression stroke by sending a fuel injection control signal to a fuel injection system 106 comprising one or more fuel injectors.

A selecting section 107 selects, as the target combustion mode, one of the homogeneous combustion mode and the stratified combustion mode in accordance with one or more engine operating conditions.

The measuring section 104 may comprise a first subsection or counter 104a for signaling the first injection time according to the homogenous mode injection timing by monitoring the crank angle, and a second subsection or counter 104b for signaling the second injection time according to the stratified mode injection timing by monitoring the crank angle.

The present application is based on Japanese Patent Application No. 9-225329. The entire contents of this Japanese Patent Application No. 9-225329 filed on Aug. 21, 1997 in Japan are hereby incorporated by reference.

What is claimed is:

1. A direct injection internal combustion engine comprising:

a fuel injection system for injecting fuel directly into a combustion chamber of the engine and for changing over a combustion mode of the engine between a homogeneous charge combustion mode and a stratified charge combustion mode by changing a fuel injection timing between a homogeneous mode injection timing on an intake stroke for the homogeneous combustion mode and a stratified mode injection timing on a compression stroke for the stratified combustion mode; and a controller for selectively calculating only one of a homogeneous mode fuel injection quantity for the homogeneous combustion mode and a stratified mode fuel injection quantity for the stratified combustion mode, for calculating the homogeneous mode injection timing in accordance with the homogeneous mode fuel injection quantity during a period of the homogeneous combustion mode, and for calculating the homogeneous mode injection timing in accordance with the stratified mode fuel injection quantity during a period of the stratified combustion mode.

2. The internal combustion engine according to claim 1 wherein the controller is configured to select, as a target combustion mode, one of the homogeneous mode and the stratified mode, to calculate only the homogeneous mode fuel injection quantity if the homogeneous mode is selected and only the stratified mode fuel injection quantity if the stratified mode is selected, to calculate the homogenous mode injection timing both when the homogeneous mode is selected and when the stratified mode is selected, and to calculate the homogenous mode injection timing in accordance with the homogeneous mode injection quantity when the homogeneous mode is selected, and in accordance with the stratified mode injection quantity when the stratified mode is selected.

3. The internal combustion engine according to claim 2 wherein the controller compares the homogeneous mode injection quantity and the stratified mode injection quantity to determine a greater fuel injection quantity which is equal to the homogeneous mode injection quantity if the homogeneous mode injection quantity is equal to or greater than the stratified mode injection quantity and which is equal to the stratified mode injection quantity if the stratified mode injection quantity is greater than the homogeneous mode injection quantity, and the controller calculates the homogeneous mode injecting timing in accordance with the greater fuel injection quantity.

4. The internal combustion engine according to claim 2 wherein the controller comprises a fuel quantity calculating section for calculating only one of the homogeneous mode fuel injection quantity and the stratified mode fuel injection quantity in accordance with the target combustion mode, and a homogeneous mode injecting timing calculating section for calculating the homogenous mode injection timing in accordance with the homogeneous mode injection quantity when the homogeneous mode is selected and for calculating the homogenous mode injection timing in accordance with the stratified mode injection quantity when the stratified mode is selected.

5. The internal combustion engine according to claim 4 wherein the controller further comprises a stratified mode injection timing calculating section for calculating the stratified mode injection timing in accordance with the stratified mode injection quantity when the stratified mode is selected.

6. The internal combustion engine according to claim 5 wherein the controller further comprises a measuring section for signaling a first injection time set by the homogenous mode injection timing and a second injection time set by the stratified mode injection timing, and a fuel injection controlling section for carrying out either of a homogeneous mode fuel injection at the first injection time on the intake stroke and a stratified mode fuel injection at the second injection time on the compression stroke.

7. The internal combustion engine according to claim 6 wherein the engine further comprises an input section for sensing an engine operating condition, and the controller further comprises a selecting section for selecting, as the target combustion mode, one of the homogeneous combustion mode and the stratified combustion mode in accordance with the engine operating condition.

8. The internal combustion engine according to claim 7 wherein the input section comprises a crank angle sensor for sensing a crank angle of the engine, and the measuring section comprises a first measuring subsection for signaling the first injection time according to the homogenous mode injection timing by monitoring the crank angle and a second measuring subsection for signaling the second injection time according to the stratified mode injection timing by monitoring the crank angle.

9. The internal combustion engine according to claim 7 wherein the stratified mode injection timing calculating section continues calculating the stratified mode injection timing transiently after a changeover of the target combustion mode from the stratified combustion mode to the homogeneous combustion mode.

10. The internal combustion engine according to claim 9 wherein the stratified mode injection timing calculating section continues calculating the stratified mode injection timing for a transient period from a changeover of the target combustion mode from the stratified combustion mode to the homogeneous combustion mode until the combustion mode of the engine is entirely changed to the homogeneous mode with no cylinder excepted.

11. The internal combustion engine according to claim 9 wherein the fuel injection controlling section checks whether a homogeneous mode fuel injection on the intake stroke is performed to each of the cylinders of the engine after a changeover of the target combustion mode from the stratified mode to the homogeneous mode, and carries out a stratified mode fuel injection based on a most recent value of the stratified mode injection quantity calculated by the fuel quantity calculating section before the changeover to the homogeneous mode, to a given cylinder on the compression stroke if a homogeneous mode fuel injection is not performed to the given cylinder on the intake stroke.

12. The internal combustion engine according to claim 2 wherein the controller monitors an individual cylinder condition signal representing a condition of each cylinder of the engine, and continues calculating the stratified mode injection timing after a changeover of the target combustion mode to the homogeneous mode until the individual cylinder condition signals of all the cylinders of the engine are in a predetermined signal state to allow stoppage of the stratified mode fuel injection.

13. The internal combustion engine according to claim 12 wherein the controller saves a most recent value of the stratified mode injection quantity obtained during operation of the stratified combustion mode, and uses the most recent value of the stratified mode injection quantity in calculation of the stratified mode injection timing after a changeover of the combustion mode to the homogeneous mode.

14. A direct injection internal combustion engine comprising:

a fuel injection system for injecting fuel directly into a combustion chamber of the engine and for changing over a combustion mode of the engine between a homogeneous charge combustion mode and a stratified charge combustion mode by changing a fuel injection timing between a homogeneous mode injection timing on an intake stroke for the homogeneous combustion mode and a stratified mode injection timing on a compression stroke for the stratified combustion mode;

a sensor for sensing an engine operating condition; and a controller for selecting, as a target combustion mode, one of the homogeneous mode and the stratified mode in accordance with the engine operating condition, for calculating only the homogeneous mode fuel injection quantity if the homogeneous mode is selected and only the stratified mode fuel injection quantity if the stratified mode is selected, and for calculating the homogeneous mode injection timing in accordance with the homogeneous mode injection quantity when the homogeneous mode is selected, and for calculating the homogeneous mode injection timing in accordance with the stratified mode injection quantity when the stratified mode is selected.

15. The internal combustion engine according to claim 14 wherein the controller comprises:

a selecting section for selecting, as the target combustion mode, one of the homogeneous combustion mode and the stratified combustion mode in accordance with the engine operating condition;

a fuel quantity calculating section for calculating only one of the homogeneous mode fuel injection quantity and the stratified mode fuel injection quantity in accordance with the target combustion mode;

a stratified mode injection timing calculating section for calculating the stratified mode injection timing in accordance with the stratified mode injection quantity when the stratified mode is selected;

a homogeneous mode injecting timing calculating section for calculating the homogenous mode injection timing in accordance with the homogeneous mode injection quantity when the homogeneous mode is selected and for calculating the homogenous mode injection timing in accordance with the stratified mode injection quantity when the stratified mode is selected;

a measuring section for signaling a first injection time set by the homogenous mode injection timing and a second injection time set by the stratified mode injection timing; and a fuel injection controlling section for carrying out either of a homogeneous mode fuel injection at the first injection time on the intake stroke and a stratified mode fuel injection at the second injection time on the compression stroke.

16. An engine control process for controlling a direct injection internal combustion engine with a fuel injection system for injecting fuel directly into a combustion chamber of the engine and for changing over a combustion mode of the engine between a homogeneous charge combustion mode and a stratified charge combustion mode by changing a fuel injection timing between a homogenous mode injection timing on an intake stroke for the homogeneous combustion mode and a stratified mode injection timing on a compression stroke for the stratified combustion mode, the engine control process comprising:

a selecting step for selecting, as the target combustion mode, one of the homogeneous combustion mode and the stratified combustion mode in accordance with the engine operating condition;

a fuel quantity calculating step for calculating only one of the homogeneous mode fuel injection quantity and the stratified mode fuel injection quantity in accordance with the target combustion mode; and a homogeneous mode injecting timing calculating step for calculating the homogenous mode injection timing in accordance with the homogeneous mode injection quantity when the homogeneous mode is selected and for calculating the homogenous mode injection timing in accordance with the stratified mode injection quantity when the stratified mode is selected.

17. The engine control process according to claim 16 wherein the control process further comprises:

a stratified mode injection timing calculating step for calculating the stratified mode injection timing in accordance with the stratified mode injection quantity when the stratified mode is selected;

a measuring step for signaling a first injection time set by the homogenous mode injection timing and a second injection time set by the stratified mode injection timing; and a fuel injection controlling step for carrying out either of a homogeneous mode fuel injection at the first injection time on the intake stroke and a stratified mode fuel injection at the second injection time on the compression stroke.

* * * * *